United States Patent
Lienkamp et al.

(10) Patent No.: US 9,711,808 B2
(45) Date of Patent: Jul. 18, 2017

(54) METHOD FOR OPTIMIZED EXECUTION OF HEATING TASKS IN FUEL CELL VEHICLES

(75) Inventors: Sebastian Lienkamp, Budenheim (DE); Remy Fontaine, Wiesbaden (DE)

(73) Assignee: GM Global Technology Operations LLC, Detroit, MI (US)

(*) Notice: Subject to any disclaimer, the term of this patent is extended or adjusted under 35 U.S.C. 154(b) by 2168 days.

(21) Appl. No.: 12/053,979

(22) Filed: Mar. 24, 2008

(65) Prior Publication Data
US 2009/0236436 A1 Sep. 24, 2009

(51) Int. Cl.
| | |
|---|---|
| *B60H 1/06* | (2006.01) |
| *F28D 15/00* | (2006.01) |
| *H01M 8/04* | (2016.01) |
| *H01M 8/04007* | (2016.01) |
| *H01M 8/04223* | (2016.01) |
| *H01M 8/04746* | (2016.01) |

(52) U.S. Cl.
CPC ... *H01M 8/04037* (2013.01); *H01M 8/04268* (2013.01); *H01M 8/04768* (2013.01); *H01M 2250/20* (2013.01); *Y02T 90/32* (2013.01)

(58) Field of Classification Search
CPC ............ B64D 2013/0603; B64D 13/08; B60H 1/00385
USPC ...................... 237/12.3 B; 429/435; 903/908; 236/34.5; 180/229
See application file for complete search history.

(56) References Cited

U.S. PATENT DOCUMENTS

| | | | | |
|---|---|---|---|---|
| 4,734,269 A | * | 3/1988 | Clarke | A61M 1/3627 422/231 |
| 6,195,999 B1 | * | 3/2001 | Arnold et al. | 60/649 |
| 6,383,672 B1 | * | 5/2002 | Fujita | 429/434 |
| 6,448,535 B1 | * | 9/2002 | Ap | 219/208 |
| 6,454,180 B2 | * | 9/2002 | Matsunaga et al. | 237/12.3 B |
| 6,595,433 B2 | * | 7/2003 | Ap et al. | 237/12.3 B |
| 6,705,101 B2 | * | 3/2004 | Brotz | B60H 1/00 62/198 |
| 6,732,942 B1 | * | 5/2004 | Sangwan et al. | 237/12.3 B |
| 6,852,435 B2 | * | 2/2005 | Vuk et al. | 429/439 |
| 6,955,059 B2 | * | 10/2005 | Lifson | F25B 41/04 62/197 |
| 7,055,337 B2 | * | 6/2006 | Horn et al. | 62/199 |
| 7,240,725 B2 | * | 7/2007 | Horn et al. | 165/202 |
| 7,434,609 B2 | * | 10/2008 | Horn | B60H 1/00428 165/42 |
| 7,520,320 B2 | * | 4/2009 | Itoh et al. | 165/202 |

(Continued)

FOREIGN PATENT DOCUMENTS

| | | |
|---|---|---|
| DE | 4327261 C1 | 10/1994 |
| DE | 102006005176 A1 | 8/2007 |

(Continued)

*Primary Examiner* — Alissa Tompkins
*Assistant Examiner* — Phillip E Decker
(74) *Attorney, Agent, or Firm* — Quinn IP Law

(57) ABSTRACT

A heating system for optimizing execution of heating tasks in a fuel cell vehicle is disclosed, the system including a stack coolant loop with a fuel cell stack, a primary pump, and a radiator module. A bypass coolant loop is disposed parallel with and is connected to the stack coolant loop between the fuel cell stack and the radiator module. The bypass loop including a cabin heat exchanger and a coolant heater, along with a secondary pump for pumping coolant through the heaters when desired.

6 Claims, 1 Drawing Sheet

(56) References Cited

U.S. PATENT DOCUMENTS

| | | | |
|---|---|---|---|
| 7,886,988 B2* | 2/2011 | Schwartz et al. | 237/12.3 R |
| 2001/0045103 A1* | 11/2001 | Khelifa | 62/244 |
| 2003/0217559 A1* | 11/2003 | Ieda et al. | 62/230 |
| 2004/0050944 A1* | 3/2004 | Matsunaga et al. | 237/12.3 B |
| 2005/0167169 A1* | 8/2005 | Gering et al. | 180/65.2 |
| 2006/0099469 A1 | 5/2006 | Meltser et al. | |
| 2007/0298298 A1 | 12/2007 | Ishigaki et al. | |
| 2009/0208782 A1* | 8/2009 | Lienkamp et al. | 429/13 |
| 2009/0283604 A1* | 11/2009 | Martinchick et al. | 237/12.3 B |
| 2014/0158784 A1* | 6/2014 | Lundberg | B60H 1/032 237/12.3 B |
| 2016/0068043 A1* | 3/2016 | Djermester | B60H 1/032 237/12.3 B |

FOREIGN PATENT DOCUMENTS

| | | |
|---|---|---|
| DE | 102007054299 A1 | 5/2009 |
| DE | 112007002347 T5 | 7/2009 |
| JP | 2007294305 | 11/2007 |
| WO | WO-2007/069022 A2 * | 6/2007 |
| WO | WO 2007/069022 A2 * | 6/2007 |

* cited by examiner

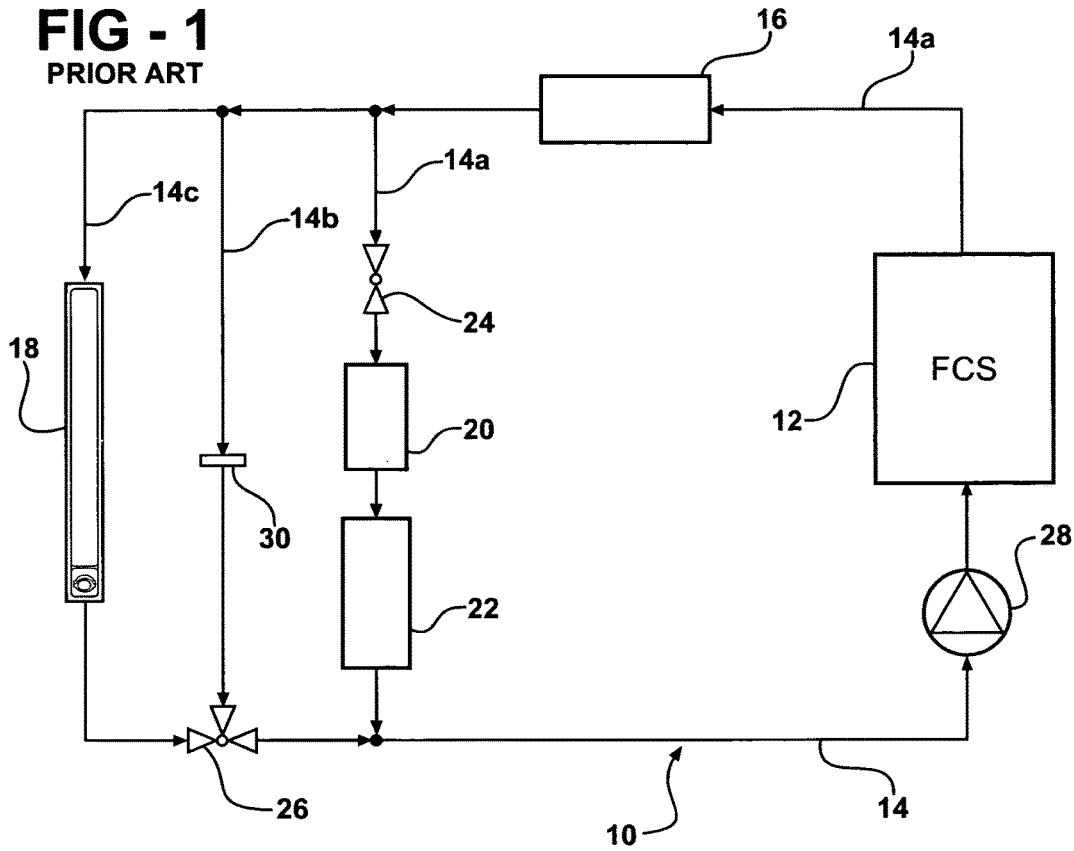
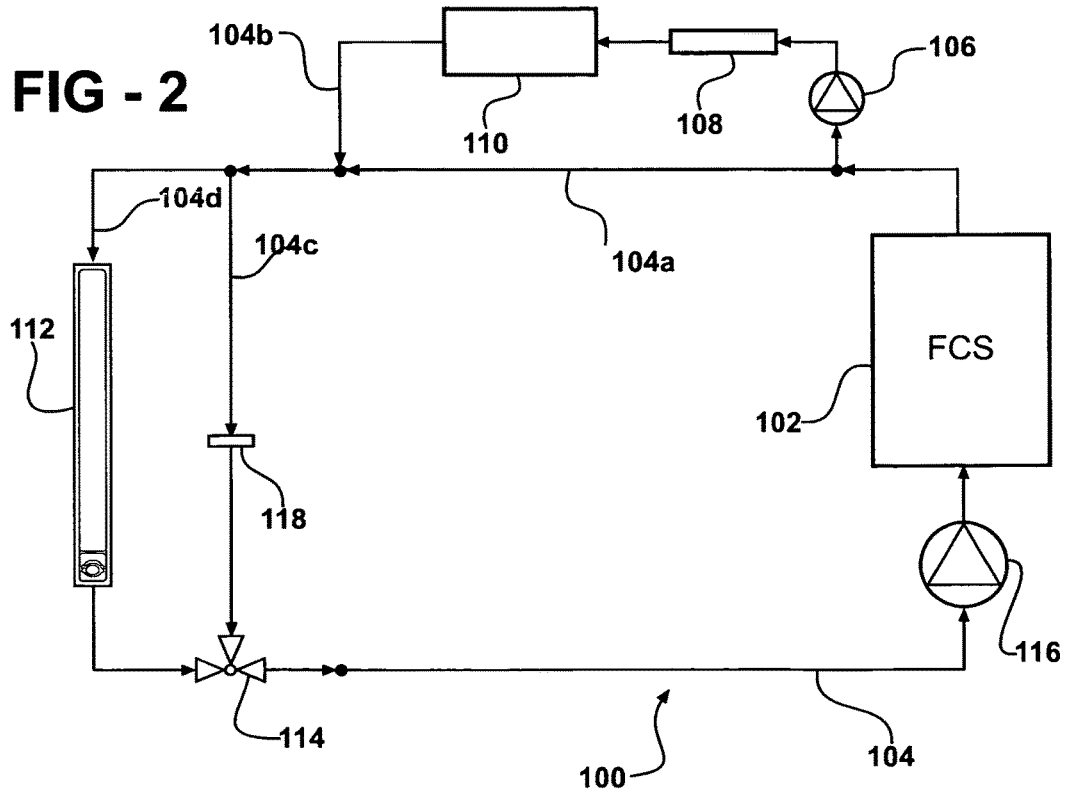

METHOD FOR OPTIMIZED EXECUTION OF HEATING TASKS IN FUEL CELL VEHICLES

FIELD OF THE INVENTION

The present invention relates to a fuel cell system and, more particularly, to an apparatus and method for optimized execution of heating tasks in fuel cell vehicles.

BACKGROUND OF THE INVENTION

A fuel cell has been proposed as a clean, efficient, and environmentally responsible energy source for electric vehicles and various other applications. In particular, the fuel cell has been identified as a potential alternative for the traditional internal-combustion engine used in modern vehicles. One type of fuel cell is known as a proton exchange membrane (PEM) fuel cell. Individual fuel cells can be stacked together in series to form a fuel cell stack. The fuel cell stack is capable of supplying a quantity of electricity sufficient to provide power to a vehicle.

Hydrogen is a very attractive fuel because it is consumed in a clean manner reacting to water vapor and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus, are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane, for example. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture, and the membrane define a membrane electrode assembly (MEA).

Several individual fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode reactant gas such as hydrogen that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The high temperature cooling loop (HT loop) in a fuel cell vehicle serves several purposes, including but not limited to:
1. providing the desired coolant outlet/inlet temperature for the fuel cell stack itself by feeding coolant with a certain temperature and flowrate into the stack;
2. providing the desired coolant inlet temperature and flow to the cabin heat exchanger; and
3. providing the desired coolant inlet temperature and flow to an electrical coolant heater that dissipates excess electrical energy during emulated engine braking operation.

Stack coolant flow and coolant inlet temperature may be dependent on operating conditions such as stack temperature, stack load, etc.

If full performance of the cabin heat exchanger is required, e.g. for a windscreen defrost operation, an inlet temperature substantially higher than stack coolant outlet temperature may be required, whereas required flows are comparatively small. However, the package spacing requirements in the HVAC unit often do not allow for a cabin heat exchanger core design that can handle the full coolant flow leaving the stack. While it is desired to take advantage of the stack off heat for cabin heating, an additional heater is typically required to maximize the coolant temperature if stack load is small.

SUMMARY OF THE INVENTION

The present invention overcomes the fuel cell system heating issues, including cabin heat issues, experienced by current systems. While the present invention discusses a PEMFC system, the invention can be used with any fuel cell arrangement.

In one embodiment, the invention is directed to a heating system for optimizing execution of heating tasks in a fuel cell vehicle. The system comprises a stack coolant loop including a fuel cell stack, a primary pump and a radiator module. A bypass coolant loop runs parallel with and is connected to the stack coolant loop preferably between the fuel cell stack and the radiator module. The bypass loop includes at least one heater and a secondary pump for pumping coolant through the heater when desired. The bypass loop typically includes at least two heaters: an electrical coolant heater and a coolant to cabin air heat exchanger.

BRIEF DESCRIPTION OF THE DRAWINGS

The above, as well as other advantages of the present invention, will become readily apparent to those skilled in the art from the following detailed description, when considered in the light of the accompanying drawings:

FIG. 1 illustrates a schematic flow diagram of a known fuel cell vehicle thermal system; and FIG. 2 illustrates a schematic flow diagram of a fuel cell vehicle thermal system according to an embodiment of the present invention.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIG. 1 illustrates a heating system 10 according to the prior art. The heating system 10 is in communication with a fuel cell stack (FCS) 12. A coolant flow path 14 includes three parallel flow path sections 14a, 14b, 14c. The coolant flow path 14 further includes a three way valve 26 to control flow through the coolant flow ratio through path sections 14b, 14c and a pump 28. A first electrical heater (CoH2) 16 is disposed in the coolant flow path 14 downstream of the FCS 12 to dissipate excess electrical energy and to warm up the FCS after a cold soak. The resulting heat of excess energy dissipation may be directed to the radiator module 18 along the coolant path section 14c. A second electrical heater (CoH1) 20, together with a cabin heat exchanger (CH) 22 is located in the coolant flow path section 14a parallel to the radiator module 18, and maintains a desired cabin heat exchanger inlet temperature. To provide maximum coolant flow through the radiator module 18, i.e. full radiator performance, in hot ambient conditions where no cabin heating is needed, a shut-off valve 24 is added to flow path section 14a.

The pressure drops in the coolant flow path 14 that impact a flow ratio between the coolant flow path 14 and the cabin heat exchanger 22 are selected so the cabin heat exchanger 22 capability is not exceeded at full stack flow. Full stack flow may occur where all of the coolant flow not caused to flow through the coolant flow path section 14a and the cabin heat exchanger 22 passes through the radiator module 18 featuring a relatively high pressure drop.

However, pressure drop and flow ratios need to allow sufficient coolant flow in the coolant flow path section 14a at low stack coolant flows. In order to ensure the above in cases where the valve 26 directs some or all of the flow to the radiator module 18 through the bypass path section (14b) instead a flow restriction device 30 is provided in the coolant flow path section 14b.

FIG. 2 illustrates a heating system 100 according to an embodiment of the invention. The heating system 100 is adapted to optimize heating tasks in a fuel cell vehicle. The heating system 100 includes a fuel cell stack (FCS) 102. A stack coolant loop 104 having a flow path section 104a located parallel to a coolant flow path section 104b is in fluid communication with the fuel cell stack 102. The coolant flow path section 104b includes a secondary pump 106, a coolant heater 108, and a cabin heat exchanger 110.

Additionally, coolant flow path sections 104c, 104d are provided in the coolant flow path 104. A flow of the coolant through the coolant flow path sections 104c, 104d is controlled by a three way valve 114. Similar to the heating system 10, heat in the coolant may be directed to the radiator module 112 through the coolant flow path section 104d.

The coolant flow path section 104b including the cabin heat exchanger 110 and the coolant heater 108 provides parallel flow to the flow path section 104a between the fuel cell stack 102 and the radiator module 112, and series flow with the coolant flow path sections 104c, 104d. The coolant flow path section 104b is also referred to herein as a bypass coolant loop. A flow split between the coolant flow path section 104b and the coolant flow path section 104a is determined by a secondary pump 106 located in the coolant flow path section 104b. The cabin heat exchanger 110 and the secondary pump 106 are sized to meet the vehicle passenger cabin heating requirements, as well as emulated engine braking related requirements, i.e. without local boiling of the coolant in flow path section 104b.

During a cabin heating operation, only a limited flow (i.e. low power to the secondary pump 106) is needed for the coolant flow path section 104b in order to reach high coolant temperatures at the cabin heat exchanger inlet with low coolant heater power.

During an emulated engine braking operation, a higher flow (i.e. high power to the secondary pump 106) is required to enable acceptance of high power to the coolant heater 108 without local coolant boiling. Additionally, since the coolant heater 108 is used to dissipate excess electrical power, the extra power consumption of the secondary pump 106 during the higher flow requirement just reduces the amount of excess power dissipated to the coolant heater 108. Therefore, the fuel consumption of the fuel cell system 102 generating the power is not affected by the extra power demand of the secondary pump.

With the heating system 100, the coolant flow in the coolant flow path section 104b is not dependent upon overall coolant flow and a complexity of design of the heating system 100 in respect of pressure drop is minimized. The coolant flow to the coolant flow path section 104b may be chosen independently during operation of the vehicle, and may be provided at a rate higher than the coolant flow in the fuel cell stack 102, if desired. If it is desired to provide a coolant flow to the coolant flow path section 104b than the coolant flow to the fuel cell stack, then a reverse in the flow direction in the coolant flow path section 104a results.

The controllability of the flow to the cabin heat exchanger 110 provided by the heating system 100 is improved over the heating system 10, which controls the flow just by the shut-off valve 24. In the heating system 10, the flow to the cabin heat exchanger 110 can only be reduced compared to the value given by the pressure drops but not increased or even be increased above stack coolant flow.

The heating system 100 of the present invention allows for the use of stack offheat for passenger cabin heating by reducing the load of the coolant heater 108, while permitting the full stack flow to be directed to the radiator module 112 without needing a shut off valve for the coolant flow path section 104b.

The shut-off valve 24 is replaced by the secondary pump 106. One electrical heater can be eliminated, as the only remaining heater of the heating system 100 can serve necessary operating requirements.

Due to the secondary pump 106, the flow restriction device 118 could be eliminated. It still eases flow distribution control by the valve 114 between the flow path sections 104c, 104d, but is not needed to ensure flow through the flow path section 104b.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for optimizing execution of heating tasks in a fuel cell vehicle, the method comprising the steps of:
   providing a stack coolant loop including a fuel cell stack comprising a fuel cell stack outlet, a primary pump, and a radiator module comprising a radiator module inlet;
   providing a bypass coolant loop in fluid communication with said stack coolant loop, said bypass coolant loop including a coolant heater, a secondary pump, and a bypass coolant loop inlet and a bypass coolant loop outlet, wherein said bypass coolant loop does not include a shut off valve;

connecting said bypass coolant loop inlet to a portion of said stack coolant loop downstream of the fuel cell stack outlet and upstream of said radiator module inlet with respect to a flow of a coolant, and connecting said bypass coolant between said bypass coolant loop inlet and said radiator module inlet; and splitting said flow of said coolant between said stack coolant loop and said bypass coolant loop;

thereby heating a passenger cabin with fuel cell stack offheat and reducing a load on the coolant heater while directing a full flow of the coolant to the radiator module without a bypass coolant loop shutoff valve.

2. The method of claim 1, further comprising the step of activating said coolant heater by pumping said coolant through said bypass coolant loop with said secondary pump.

3. The method of claim 1, wherein said bypass coolant loop further includes a cabin heat exchanger.

4. The method of claim 1, further comprising the step of activating said coolant heater and said cabin heat exchanger by pumping said coolant through said bypass coolant loop with said secondary pump.

5. The method of claim 1, further comprising the step of providing a coolant flow path section having a coolant flow path inlet and a coolant flow path outlet, said coolant flow path inlet located between said bypass coolant loop outlet and said radiator module inlet, and said coolant flow path outlet located between a radiator module outlet and said primary pump, said coolant flow path section including a flow restriction device located between said coolant flow path inlet and said coolant flow path outlet.

6. The method of claim 5, wherein one of said coolant flow path inlet and said coolant flow path outlet comprises a three-way valve.

\* \* \* \* \*